March 14, 1939.  A. BRAMLEY  2,150,818
MINE CAR
Filed Sept. 24, 1936  2 Sheets-Sheet 1
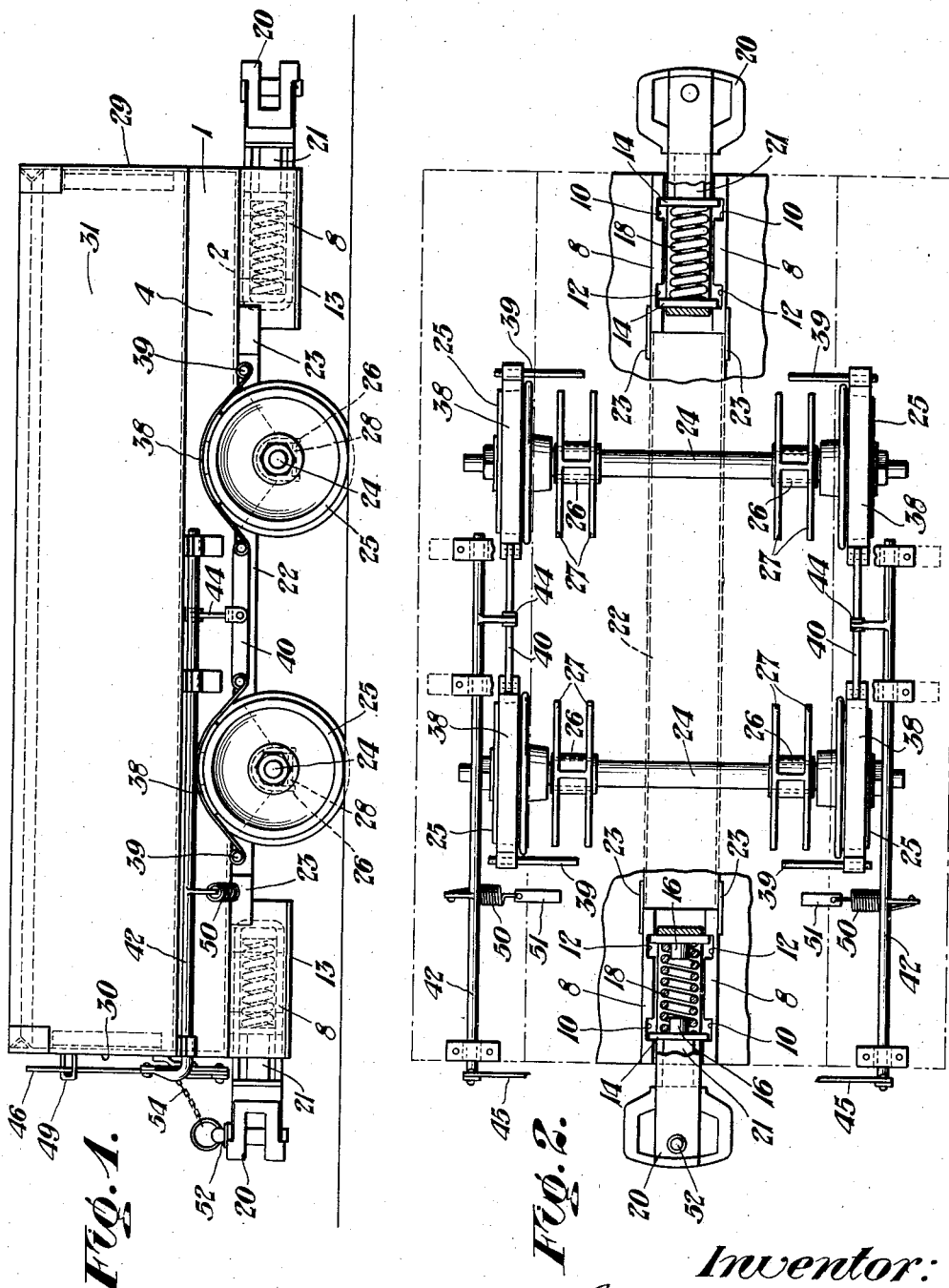
Inventor:
ARTHUR BRAMLEY,
by his Attorneys.

March 14, 1939. A. BRAMLEY 2,150,818
MINE CAR
Filed Sept. 24, 1936 2 Sheets-Sheet 2

Inventor:
ARTHUR BRAMLEY,
by
his Attorneys.

Patented Mar. 14, 1939

2,150,818

UNITED STATES PATENT OFFICE 2,150,818

MINE CAR

Arthur Bramley, Scottdale, Pa.

Application September 24, 1936, Serial No. 102,421

1 Claim. (Cl. 105—364)

This invention relates to improvements in the construction of load-carrying cars, such as mine cars and the like, and the underbodies therefor.

An object of this invention is to provide a sturdy, simply constructed underbody for load-carrying cars of the class described.

Another object is to construct an all-metal load-carrying car having a minimum number of parts, and one which is rugged and possessed of relatively long life.

The above and other objects will be apparent by referring to the following description and the drawings, in which:

Figure 1 is a side elevation of a mine car which illustrates one embodiment of my invention;

Figure 2 is a plan of the mine car, shown in Figure 1, with the car body removed.

Figure 3:
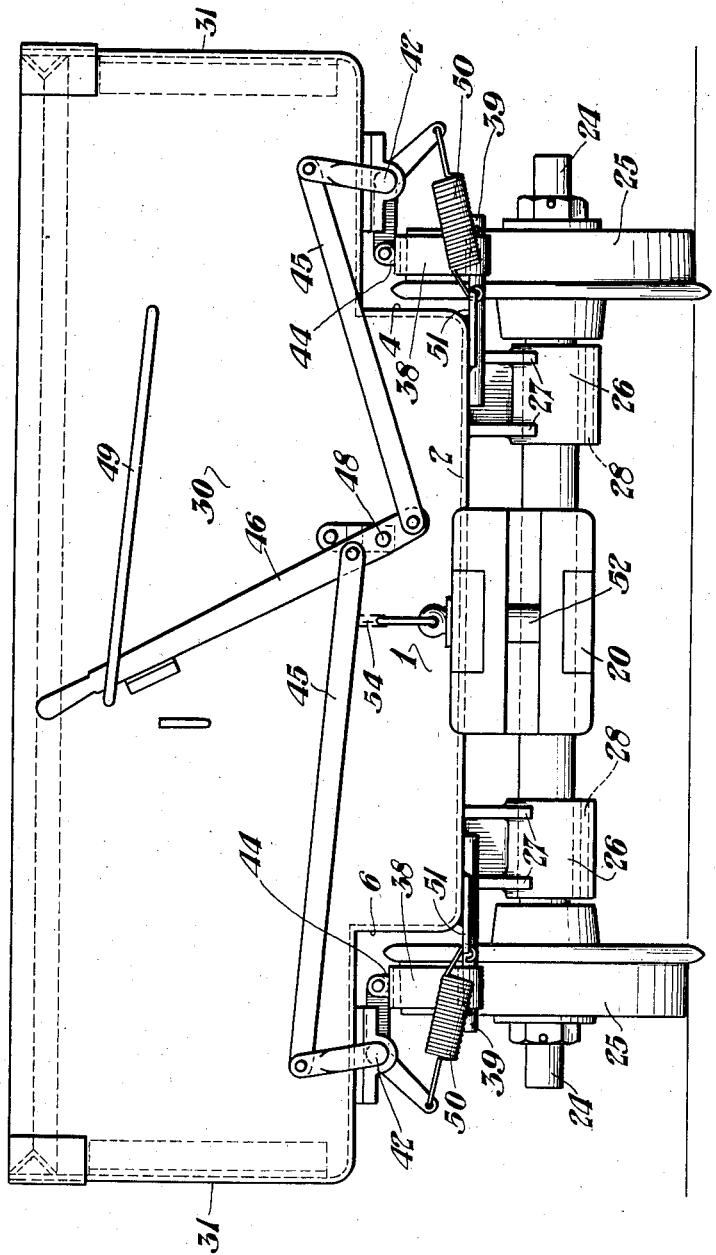
Figure 3 is an enlarged end view of the mine car, shown in Figure 1.

Referring more particularly to the drawings, the numeral 1 designates generally an underbody for a load-carrying car. The underbody 1 is principally composed of a relatively long rectangular metal sheet or plate 2 which has its longitudinal edges bent upwardly, and preferably perpendicular thereto, to form opposed flanges 4 and 6.

Bumper or coupling boxes are secured to the ends of the underbody 1 and on the under side thereof. Preferably, these boxes include opposed plates 8 which are rectangular in shape and secured to the bottom of the plate 2 by any convenient means, such as welding. The plates 8 are provided with opposed vertically extending grooves 10 and 12 adjacent the ends of the plate 2 and extending the height thereof. To complete the bumper or coupling boxes rectangular plates 13 are secured to the bottoms of the opposed plates 8.

To attach bumpers in the bumper boxes, I provide transversely positioned rectangular plates 14, whose ends are in the grooves 10 and 12, received for limited longitudinal movement. The plates 14 have bosses 16 on one side thereof which extend into springs 18 which hold the rectangular plates 14 apart. A U-shaped bumper member 20 is mounted for sliding movement between the sides of the bumper boxes and slidably surrounds the springs 18 and rectangular plates 14 so that, upon movement of the bumper member 20 away from the car body, the closed end of the bumper member 20 engages the plate 14 and compresses the spring 18. Transverse blocks 21 are secured on the U-arms of the bumper members 20 adjacent the outermost rectangular plate 14, whereby movement of the bumper members 20 toward the car compresses the springs 18 against the innermost plates 14. The width of the grooves 10 and 12 is so co-related to the strength of the springs 18 that the desired cushioning action is thereby obtained.

In order to longitudinally strengthen the plate 2 and to assist in distributing stresses from one bumper member 20 to the other, I provide a strengthening channel 22 which preferably is welded to the bottom of the plate 2 and extends between the bumper boxes mounted on the underbody 1. Bridging plates 23 may be welded over the butt-joints between the channel 22 and the inner ends of the opposed plates 8 to further strengthen the underbody 1, all as shown in Figure 2 of the drawings.

A wheel assembly, preferably comprising a pair of axles 24 each mounting two wheels 25, is secured to the bottom of the underbody 1. To accomplish this result, means, such as housings 26 of inverted U-shape in cross-section, are suitably secured to the bottom of the plate 2, as shown by trapezoidal base-plates or housing bases 27. The open bottoms of the housings 26 preferably are closed by plates 28. The housing bases 27 are positioned along the longitudinal sides of the plate 2, as seen in Figure 2 of the drawings, so that two of the housing bases 27 are in lateral alignment with one another and adjacent one end of the plate 2, and the two other housing bases 27 are positioned in lateral alignment adjacent the other end of the plate 2. The housings 26 preferably are so positioned that they divide the length of the plate 2 into approximate thirds.

In order to close the ends of the plate 2 and provide means for enlarging the containing capacity of the underbody 1, end-plates 29 and 30 are secured to the ends of the underbody 1. These end-plates, as best shown in Figure 3, are so shaped that they extend laterally beyond and upwardly from the flanges 4 and 6 of the underbody 1. To complete the upper part of the car and provide adequate load-carrying capacity therein, means, such as angle plates 31, are preferably secured to the end-plates 29 and 30.

To provide braking means for the wheels 25, semi-circular brake-bands 38 are positioned thereover. One end of each brake-band 38 is pivotally mounted on a laterally extending rod 39 secured to the underbody 1 by any suitable means. The other, or adjacent, ends of the brake-bands 38 are pivotally secured to and connected by bars 40 which are connected to brake-rods 42 by links 44. The brake-rods 42 preferably are rotatably secured to the under sides of the angle-plates 31 and are provided with two integral arms extending perpendicularly a short distance therefrom. The links 44 are connected to one of the perpendicular arms of the brake-rods 42 so that the bars 40 receive a substantially vertical motion from the arcuate motion of the brake-rods 42. The second perpendicular arm of the brake-rods 42 is connected by springs 50 to laterally extending bars 51 mounted on the plate 2 adjacent one end thereof. The springs 50 serve to hold the brake-bands 38 above the wheels 25 when no force is applied to the brake-rods 42. These brake-rods extend out a short distance from the end-plate 30 and the ends of the brake-rods 42 are bent over at right angles to the longitudinal axis thereof.

The bent over ends of the brake-rods 42 are secured to links 45 which are, in turn, secured to a lever 46. The lever 46 is fulcrumed at 48 on the end-plate 30 and the links 45 are connected to the lever 46 on opposite sides of the fulcrum 48. The movement of the lever 46 is limited by a guide 49. By moving the lever 46, a braking action is produced on the wheels 25, and when the force is removed from the lever 46 the springs 50 automatically remove the brake bands 38 from the wheels 25, as apparent from the drawings.

A heavy pin 52 is secured to the end-plate 30 by a chain 54. The pin 52 is adapted to be placed through apertures in the ends of the bumper members 20 to couple two mine cars together. The ends of the bumper members 20 are, of course, adapted to engage with each other so that car coupling is thereby made possible.

The parts of the mine car can be secured together by any means, such as bolts or rivets, but it is a distinct feature of the invention to use a welded construction throughout. By the use of such welded construction, the total weight of the car is reduced and an improved appearance and greater strength results.

It will be appreciated that the invention is not limited to the specific form illustrated and described, but is actually defined in the appended claim.

I claim:

A car body for mine cars and the like comprising a planar central bottom-plate having its longitudinal edges bent upwardly therefrom to form sides, a longitudinally extending side angle-plate positioned on each side of said central bottom-plate with the edges of its horizontal portion secured to the upper edges of the upwardly bent longitudinal edges of said bottom-plate so as to provide outboard compartments, a plate arranged at each end of said bottom-plate and said side angle-plates and securely attached thereto to provide a complete body, a plurality of axle housings secured to the under side of said central bottom-plate intermediate the ends thereof, bumper boxes secured to the under side of said central bottom-plate at each end thereof, and a strengthening member secured to the bottom side of said central bottom-plate and extending between said bumper boxes whereby an integral connected car body unit is provided.

ARTHUR BRAMLEY.